FILTERING POSITION

CAKE DISCHARGE POSITION

Inventors
Douglas A. Paisley and
Michael J. Schroeder

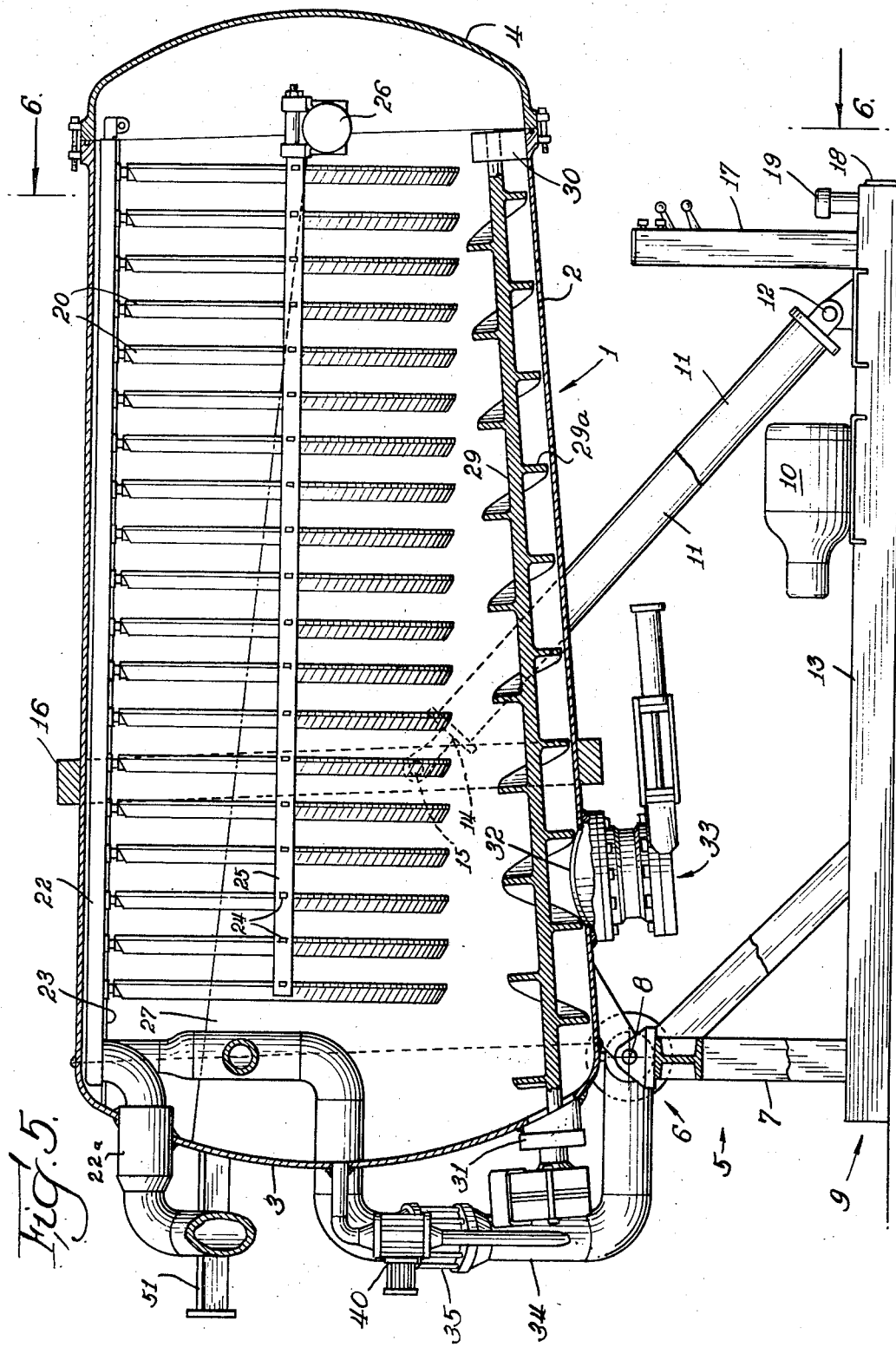

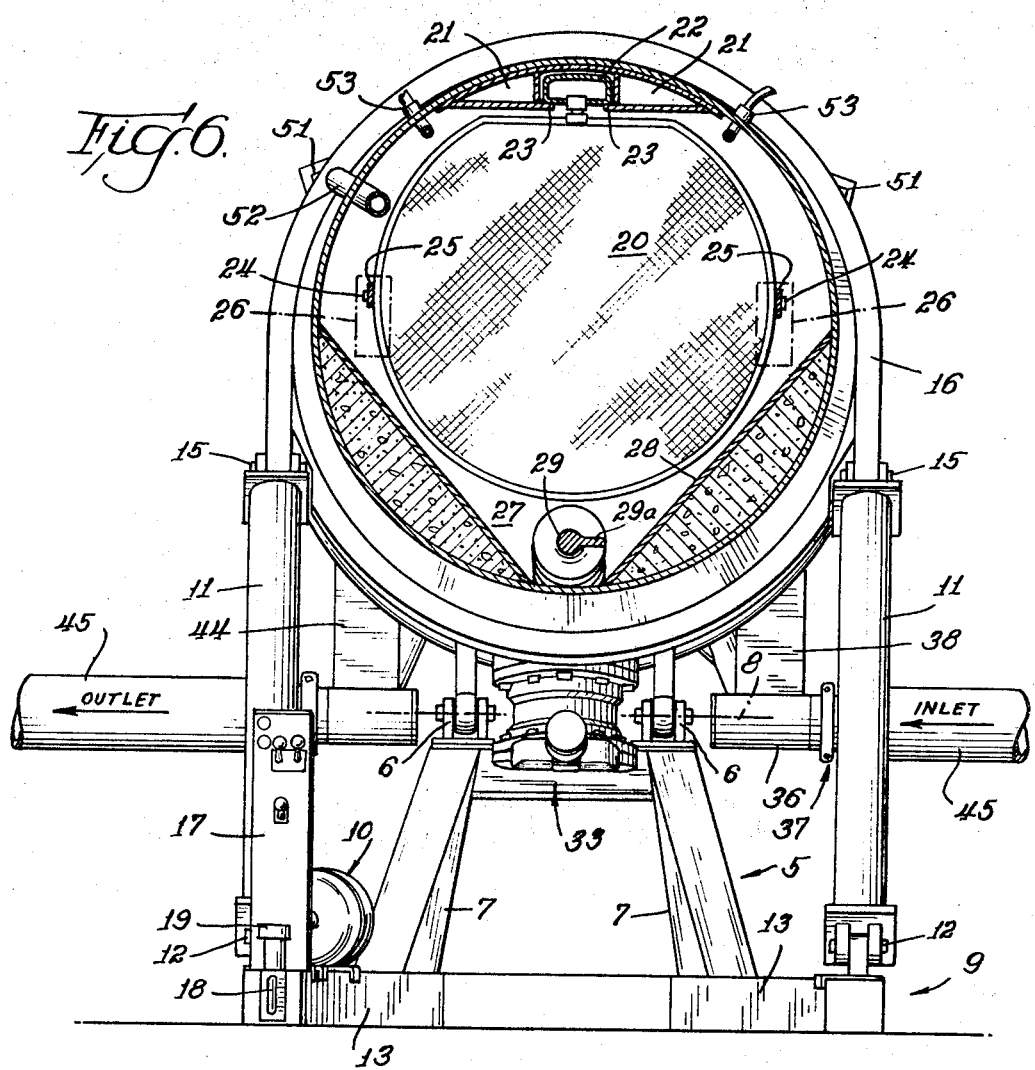

United States Patent Office 3,494,467
Patented Feb. 10, 1970

3,494,467
HORIZONTAL LEAF DRY CAKE DISCHARGE FILTER
Douglas A. Paisley, 2566 Alpaca Pass, Dallas, Tex. 75211, and Michael J. Schroeder, 1825 Cottonwood, Carrollton, Tex. 75006
Filed Apr. 3, 1968, Ser. No. 718,530
Int. Cl. B01d 25/34, 25/12
U.S. Cl. 210—241                               15 Claims

ABSTRACT OF THE DISCLOSURE

The filter unit has a conical housing tank mounted for pivotal movement through an arc of ninety degrees about a transverse axis under and at the rear of the tank. The stack of filter leaves are mounted for horizontal leaf filtering when the tank is in vertical position and the tank is lowered to horizontal position for discharge of the cake by vibration of the vertical leaves into an internal V trough which slopes downwardly toward the cake discharge port. There are no moving parts within the tank except the leaf vibrating means and a cake screw conveyor which increases progressively in diameter toward the discharge port.

Background of the invention

It is well known that filters of the type with which this invention is concerned operate most satisfactorily if the filter leaves are in horizontal position during the precoating and filtering operations and in the vertical position during cake discharge. To permit operations in this manner, large size filtering units have been designed with filter leaf assemblies which are movable within the filter tank so that the conversion may be made from horizontal to vertical position and back again in carrying out the filtering cycle. Such arrangements are necessarily somewhat complicated and require structures within the tank which may interfere with cake discharge or other aspects of operation of the filter. Simplicity and minimizing of internal mechanical elements with elimination of the necessity of moving the leaf stack with respect to the tank are desirable objectives in the design and operation of large leaf filters.

Since extensive filtering surface must be provided for handling large volumes of slurry, the amount of space required for a filtering unit and its operation is an important consideration. It is, of course, desirable to minimize the space required, including that for piping and all service requirements.

The general object of this invention is to provide a leaf filter suitable for construction in large sizes which provides for filtration with the leaves in horizontal position and cake discharge with the leaves in vertical position without the necessity of moving the leaf stack with respect to the supporting tank. Objects more specifically stated and subsidiary to the general objective include the provision of simple means for moving the filter unit from the horizontal leaf filtering position to the vertical leaf cake discharge position, external piping including swivel means permitting movement of the tank without altering piping connections, a conical tank which houses not only the leaf stack but also accommodates a built-in V cake trough which slopes downwardly to the cake discharge port and is provided with a screw conveyor which, along with the trough, increases in size to handle the increasing load of cake toward the cake discharge port, hydraulic apparatus for moving the tank between filtering and cake discharge positions and also to operate the auger cake conveyor, and internal means for vibrating the filter leaves to shake the cake from the leaves.

Description of the drawings

In the accompanying drawings:
FIG. 5 is a sectional view of the filter unit taken at the line 5—5 of FIG. 3,
and
FIG. 6 is a cross-section view taken at the line 6—6 of FIG. 5.

Description of the preferred embodiment

The functional filtering apparatus is contained in a housing tank, designated generally by the numeral 1, which comprises a frusto-conical body 2 permanently closed at its larger, rear end by head 3 and a removable cover 4 normally closing its smaller, front end. As will be described more fully hereinafter, influent and effluent piping fittings are mounted upon and in head 3. Cover 4 provides access to the interior of the filter tank for necessary servicing.

Figure 1:
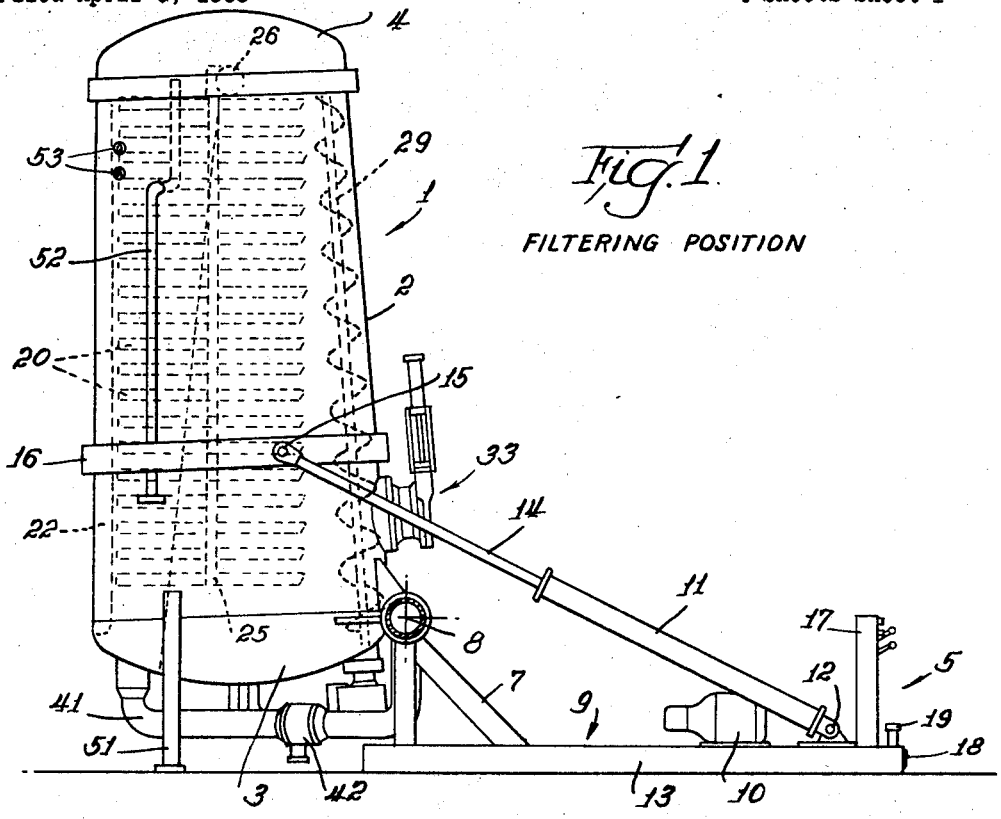
FIG. 1 is a side elevational view of the entire filter unit showing the filter tank in vertical, filtering position.
Figure 2:
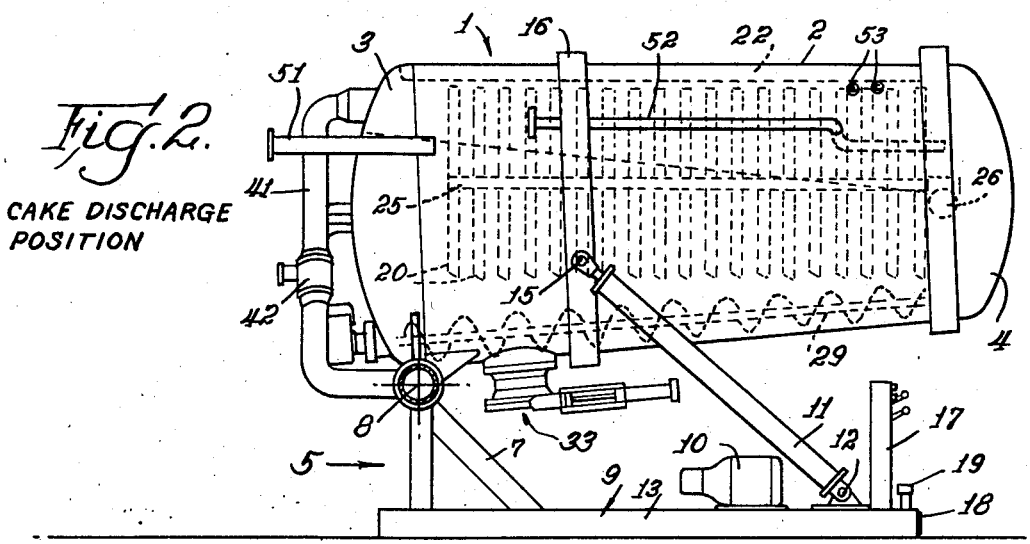
FIG. 2 is a side elevational view of the filter unit of FIG. 1 but showing the tank in horizontal, cake discharge position.
Figure 3:
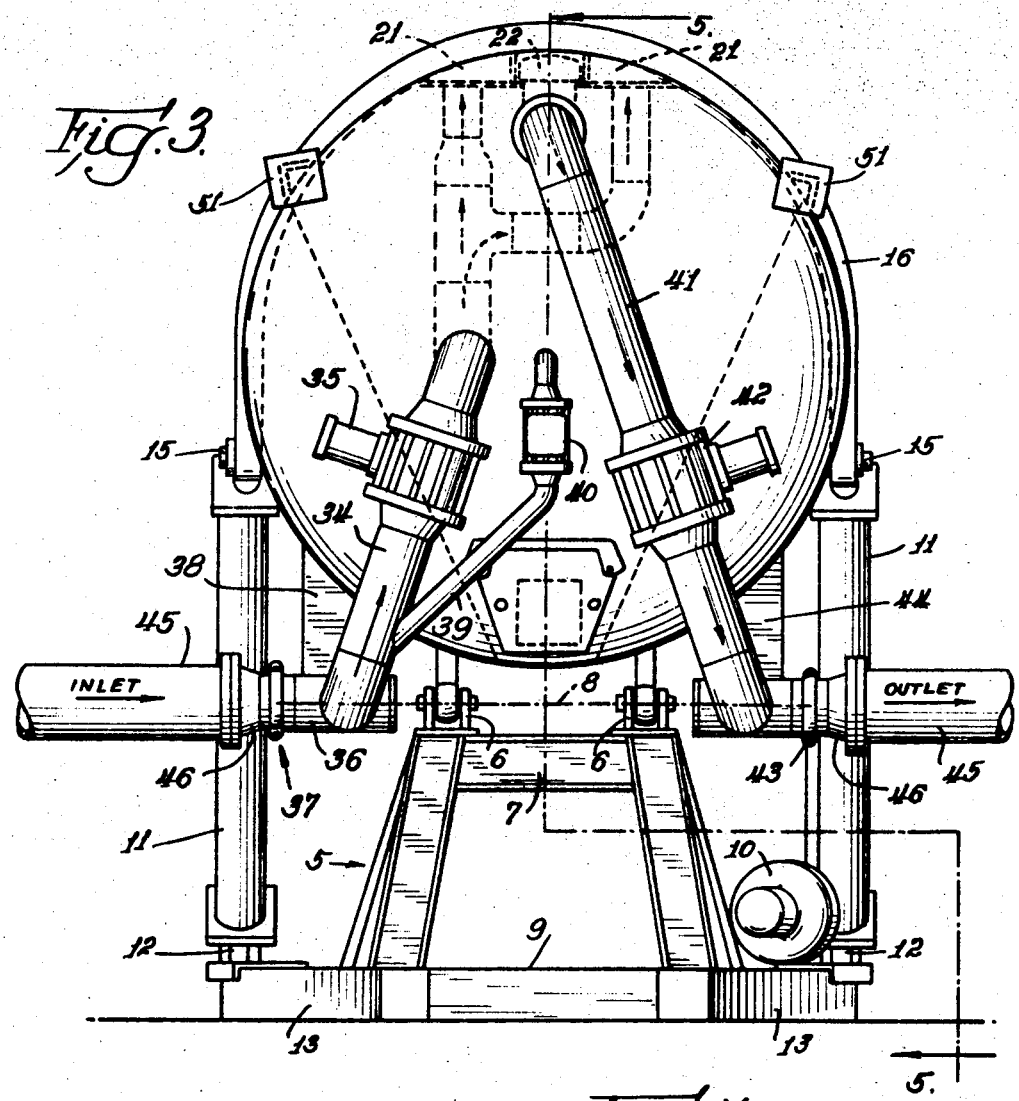
FIG. 3 is a rear view of the filtering unit with the tank in horizontal position and showing the piping, supporting and pivoting arrangements.

The filter tank is mounted upon a support designated generally 5. The principal support for the tank is provided by pivot assemblies 6 which, in turn, are mounted upon a stanchion 7. The arrangement is such that the tank may be moved in rotation about axis 8 (FIG. 3) through an arc of ninety degrees, the limiting extreme positions being the vertical position shown in FIG. 1 and the horizontal position shown in FIG. 2.

To complete the support for the filtering tank and provide for its movement about axis 8 as described, hydraulic apparatus is mounted upon support base 9 which, together with stanchion 7, comprises the total supporting frame for the filter tank. The hydraulic operating and supporting apparatus include a hydraulic pump and motor 10, a pair of lift cylinders 11 pivotally mounted at 12 near the forward ends of base members 13, cooperating hydraulic piston rods 14 pivotally connected at 15 to a tank stiffening and supporting ring 16 fastened upon tank 2. Base elements 13 are used as oil reservoirs and hydraulic control panel 17 is mounted upon one of these base members for operating the hydraulic apparatus. An oil lever indicator 18 and a suitable oil filling plug 19 may be provided to maintain the proper oil supply in the reservoir.

A plurality of circular filter leaves 20, which may be of conventional construction, are supported as a stack within filter tank 1 by means of influent and effluent conduit structure permanently mounted along the inner surface of tank body 2 which is uppermost when the tank is in its horizontal position. As is best seen in FIG. 6, this structure includes a pair of conduits 21 which form inlet risers and and a filtrate manifold 22 arranged between the inlet risers. Provision is made for both support of the filter leaves from, and fluid connection of the leaves with, manifold 22. The manifold rests upon flanges 23 which may be integral extensions of the body walls of riser conduits 21, as shown. The arrangement is such that the entire stack of filter leaves may be removed from the filter tank by withdrawing manifold 22 from connection sleeve 22a, sliding it out along the supporting flanges 23. The auxiliary equipment needed to accomplish this forms no part of the invention and is not shown.

Each filter leaf is provided with a pair of lugs 24 projecting, respectively, from the opposite sides of each leaf. Vibrator bars 25 carrying vibrators 26 at one end engage the lugs 24 of all of the filter leaves to shake the leaves and loosen the filter cake therefrom as will be described more fully hereinafter.

A V trough 27 is formed within tank 1 along what is the bottom of the tank when it is in horizontal position. This trough is formed by sheet metal walls 28, these walls being permanently welded to tank body 2. The spaces between walls 28 and the conical tank body may be packed with a suitable incompressible material, such as concrete, to give support to the trough walls. The packing when used is sealed over by the sheet metal covering from fluids which may be contained in the tank.

An auger type screw conveyor 29 is arranged along the bottom of V trough 27. This conveyor is journaled at its ends in bearing blocks 30 and 31, the former being mounted inside of the filter tank and the latter being mounted externally of the tank at the bottom of its rear end to support, also, a hydraulic motor for driving the conveyor. For purposes hereinafter explained, the flight 30 of the screw conveyor progressively increases in diameter from the remote, front end to the rear end which lies lower in V trough 27. The flight is also reversed in pitch between the location of cake discharge port 32 and the rear end of the conveyor.

The cake discharge port is provided with a suitable gate valve 33 which may be hydraulically controlled, as indicated.

Pipe fittings for connecting the filter unit with process piping are mounted upon the filter tank at its closed rear end. Inlet piping 34 with inlet valve 35 is mounted in, and passes through, tank end head 3 and is divided and connects internally with risers 21. Externally, the inlet piping connects with the portion 36 of swivel joint 37 which is supported from the tank by means of a web 38. A filter tank drain pipe 39, which is also provided with a valve 40, connects what would be the bottom of the tank when the tank is in vertical position with the inlet piping, as shown, to drain liquid from the tank, when desired.

Outlet piping 41 with valve 42 connected therein is mounted upon and passes through tank end head 3 and connects internally with inlet manifold 22. The external connection is made to the portion of swivel joint 43 which is fixed relative to the filter tank by virtue of supporting web 44.

Process piping 45 is connected with the respective swivel joints by means of fittings 46 which are stationary.

Figure 4:
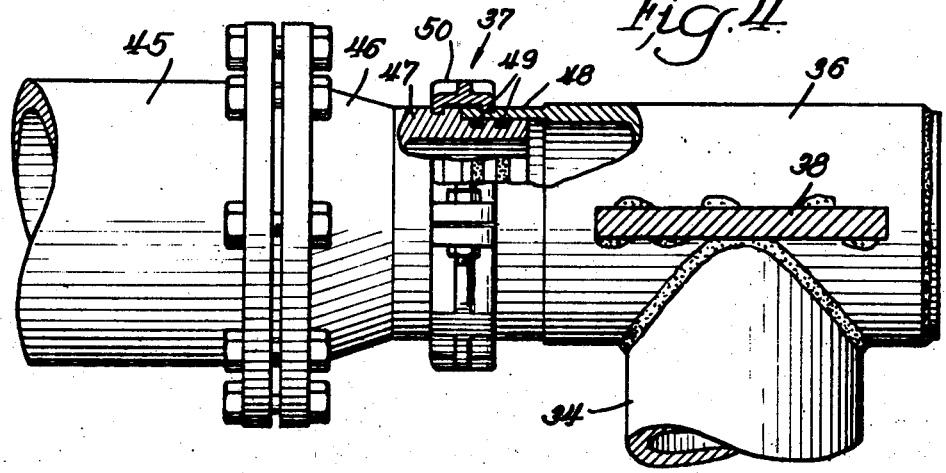
FIG. 4 is a detail view, partly in section, showing the construction of a piping swivel at the pivotal axis of the unit.

A typical swivel joint 37 is illustrated in detail in FIG. 4. Fitting 46, which is bolted to stationary process piping 45, terminates in a carefully machined male rotary sealing element 47. The cooperating female rotary seal element 48 is the carefully machined terminus of a filter piping element, e.g., fitting 36, the opposite end of this fitting being closed. Ring gaskets 49 are seated in annular grooves provided for this purpose and ring clamp 50 which extends into annular grooves in the external surfaces of the respective elements of the rotary seal, retains the parts in their operative positions while permitting relative rotation as the filter tank is raised and lowered.

To initiate the filtering cycle in the operation of the filter, the tank is moved to the vertical position, resting upon fixed legs 51. The filter leaves which, in the vertical position of the tank, are horizontal, are precoated as desired by pumping the precoat slurry into the tank through through inlet piping 34 through connections in the process piping not shown. As the tank fills, the air contained therein is vented through vent pipe 52. The filter is then ready for normal operation in the separation of solid particles from the slurry which is pumped to the tank following completion of the filter leaf precoating. The slurry is continuously supplied through inlet risers 21 at the top of the tank and the cake is permitted to build up on the filter leaves, the filtrate flowing into the filtrate manifold 22 from the several leaves and conducted away through outlet piping 41. When the filter cake has built up to the optimum thickness, clear water or other appropriate liquid may be pumped through the filter after which, if desired, the cake may be at least partially dried by blowing air through the unit.

To remove the cake from the filter leaves, the hydraulic position control apparatus is operated to lower the tank to its horizontal position. It should be pointed out that in this position, the axis of the tank is somewhat inclined while the top of the conical body of the tank is horizontal and the bottom slopes downwardly from the front end toward the rear end near which the cake discharge port 32 is located. The screw conveyor is activated to move cake dropping from the filter leaves into the V trough to cake discharge port 32 and gate valve 33 is opened to permit the cake to discharge from the filter. Vibrators 26 are activated by supplying air or steam to them through hose connections 53. The sides of the V trough slope toward the bottom of the trough at an angle preferably exceeding about fifty degrees and are highly polished to assure the ready slippage of the cake to the bottom of the trough and into the screw conveyor. The filter leaves may be purged with air, if desired.

When all of the filter cake has been removed from the tank, vibrators 26 and the screw conveyor are deactivated, gate valve 33 is closed and the tank is returned to its vertical operating position for initiation of the next filtering cycle.

Those familiar with the design and operation of filtration equipment will appreciate that the filter unit herein described and shown embodies a number of novel features, some of which are structurally advantageous and some of which represent improvements from the operating standpoint.

Initial installataion of the filter unit is simple. A single connection at the filter inlet and outlet swivel joints with stationary inlet and outlet plant process piping is all that is required. Since, except for occasional inspection and possible replacement of filter leaves, operation of the filter requires only the sequential manipulation of valves and hydraulic controls, the unit is amenable to automatic operation.

The filter tank may be fabricated from carbon or stainless steel. The packing which supports the trough walls permits the use of relatively thin sheet materials, resulting in very substantial cost savings when stainless steel is used. Incorporation of the trough inside of the tank results in cost and space savings. The conical shape of the tank body provides a V trough which not only slopes downwardly toward the cake discharge port but also increases progressively in size to match the progressively increasing quantity of cake that must be handled as it is released from the filter leaves and conveyed to the discharge port. The absence of any obstructions under the leaf stack avoids interference with the movement of the cake to the screw conveyor and obviates the need for auxiliary equipment frequently employed to insure such movement.

If and when desired, the entire leaf bundle, including the leaves and filtering manifold, may be removed from the tank for visual inspection and maintenance, if required.

We claim:

1. In a leaf filter apparatus having an elongated tank with external inlet and outlet connection piping and a filter cake discharge port, a stack of spaced parallel filter leaves mounted transversely of the axis of the tank for operation in fixed relations to said tank and connected with said outlet piping, cake conveyor means arranged within said tank for moving cake to said discharge port, and support means for said tank, the improvement wherein said support means comprises a base including a horizontal pivot support assembly mounted thereon and attached to said tank for supoprting said tank for limited rotation about the pivot axis which is parallel to said filter leaves whereby said tank may be moved between extreme positions whereat said filter leaves are horizontal and vertical, respectively.

2. Apparatus in accordance with claim 1 wherein the pivot support is so located with respect to the tank that the pivot axis is under the rear end of said tank.

3. Apparatus in accordance with claim 1 and including the improvement wherein a vibrator is mechanically connected with all of the filter leaves and mounted upon the stack of filter leaves for shaking the same to remove filter cake therefrom.

4. Apparatus in accordance with claim 1 and including means for moving the tank in rotation from one extreme position to the other.

5. Apparatus in accordance with claim 4 wherein the means for moving the tank comprise hydraulic cylinder means operatively connected between said tank and the tank support base.

6. Apparatus in accordance with claim 5 and including the improvement wherein the cake conveyor means comprises an auger screw conveyor and hydraulic means for driving the same mounted upon the tank.

7. Apparatus in accordance with claim 6 and including the improvement wherein the cake discharge port is provided with a valve for opening and closing the same and hydraulic means for operating said valve, the hydraulic cylinder means for moving the tank, hydraulic means for driving the screw and said hydraulic means for operating said valve all being integrated together in a single hydraulic system.

8. Apparatus in accordance with claim 6 and including the improvement wherein the cake discharge port is near but spaced from one end of the tank and the pitch of the flight of the auger screw conveyor is opposite on the portions of the conveyor on opposite sides of said cake discharge port.

9. Apparatus in accordance with claim 1 and including the improvement wherein a pair of sloping walls are affixed to the tank to form a V trough therewithin along the bottom thereof for the reception of cake from the filter leaves and transfer to the discharge port by the conveyor.

10. Apparatus in accordance with claim 9 wherein the space between the plates forming the V trough and the tank is filled with a solid material.

11. Apparatus in accordance with claim 1 and including the improvement wherein the elongated tank is conical and the filter leaves are so arranged that when said leaves are vertical the top element of said conical tank is horizontal and the bottom element slopes downwardly from the front end to the rear end thereof.

12. Apparatus in accordance with claim 11 wherein the cake discharge port is near the rear end of the tank and including the improvement wherein a pair of sloping walls are affixed in the tank to form a V trough therewithin sloping downwardly toward the discharge port.

13. Apparatus in accordance with claim 12 wherein the space between the plates forming the V trough and the tank is filled with a solid material.

14. Apparatus in accordance with claim 12 and including the improvement wherein the cake conveyor means comprises an auger screw conveyor arranged along the bottom of the V trough, the flight of said screw conveyor progressively increasing in diameter from the front end to the rear end of said V trough.

15. Apparatus in accordance with claim 14 wherein the cake discharge port is near but spaced from the rear end of the V trough and the pitch of the flight of the auger screw conveyor is opposite on the portions of the conveyor on opposite sides of said cake discharge port.

References Cited

UNITED STATES PATENTS

| 1,165,068 | 12/1915 | Butters | 210—332 |
| 2,544,402 | 3/1951 | Tessmer | 210—331 |
| 3,195,729 | 7/1965 | Kracklauer et al. | 210—344 X |
| 3,252,577 | 5/1966 | Anderson | 210—331 X |
| 3,441,141 | 4/1969 | Zimmermann et al. | 210—241 |

REUBEN FRIEDMAN, Primary Examiner

FRANK A. SPEAR, Jr., Assistant Examiner

U.S. Cl. X.R.

210—331, 332, 344